United States Patent
Young et al.

(10) Patent No.: US 6,354,092 B1
(45) Date of Patent: Mar. 12, 2002

(54) METHOD AND VALVE FOR ARRESTING LIQUID AT INTAKE OF REFRIGERATION COMPRESSOR

(75) Inventors: Michael Raymond Young, York, PA (US); Gordon Ted Boyd, Knoxville, TN (US); John Richard Walters, Abingdon; Scott Garrison Hix, Bristol, both of VA (US)

(73) Assignee: York International Corporation, DE (US)

( * ) Notice: Subject to any disclaimer, the term of this patent is extended or adjusted under 35 U.S.C. 154(b) by 0 days.

(21) Appl. No.: 09/641,950

(22) Filed: Aug. 21, 2000

(51) Int. Cl.$^7$ ................................................ F25B 43/00
(52) U.S. Cl. ............................. 62/83; 62/217; 62/503
(58) Field of Search ........................... 62/83, 217, 219, 62/220, 221, 222, 224, 225, 503

(56) References Cited

U.S. PATENT DOCUMENTS

| | | | |
|---|---|---|---|
| 3,412,547 A | * 11/1968 | Reiter | ...................... 62/503 X |
| 3,469,605 A | 9/1969 | Courtot et al. | |
| 3,513,874 A | 5/1970 | Welsh et al. | |
| 3,563,053 A | * 2/1971 | Bottum | ........................ 62/503 |
| 3,872,884 A | 3/1975 | Busdiecker et al. | ........ 137/498 |
| 3,896,834 A | 7/1975 | Paul, Jr. | .................. 137/625.2 |
| 3,957,083 A | 5/1976 | Gallo | ........................... 138/43 |
| 4,026,513 A | 5/1977 | Callenberg | ................. 251/61.1 |
| 4,188,971 A | 2/1980 | Otteson | ...................... 137/460 |
| 4,257,452 A | 3/1981 | Hill et al. | ................. 137/514.7 |
| 5,058,395 A | * 10/1991 | Ni et al. | ..................... 62/83 X |
| 5,390,696 A | 2/1995 | Bird et al. | ................... 137/494 |
| 5,462,081 A | 10/1995 | Perusek et al. | ............. 137/498 |

* cited by examiner

*Primary Examiner*—Harry B. Tanner
(74) *Attorney, Agent, or Firm*—Finnegan, Henderson, Farabow, Garrett & Dunner, LLP

(57) ABSTRACT

A liquid arresting valve for a refrigeration compressor having a refrigerant intake, including a housing having an inlet end to receive liquid and vapor phase refrigerant from an evaporator and an outlet end for connection to the refrigerant intake of the compressor, and a valve body movable in the housing between an open position permitting substantially unrestricted flow of vapor phase refrigerant between the inlet and outlet ends of the housing, and a flow restricting position to cause liquid containing refrigerant entering the inlet end of the housing to exit through the outlet end of the housing as vapor phase refrigerant.

17 Claims, 4 Drawing Sheets

METHOD AND VALVE FOR ARRESTING LIQUID AT INTAKE OF REFRIGERATION COMPRESSOR

BACKGROUND OF THE INVENTION

1. Field of the Invention

This invention relates to a liquid arresting method and apparatus for refrigeration systems, and, more particularly, to a valve device for use in the intake flow path of a refrigerant compressor, and to a method for preventing passage of liquid phase refrigerant into the compressor.

2. Description of the Related Art

In conventional mechanical refrigeration systems, a compressor circulates refrigerant through a condenser in which a refrigerant is cooled and liquified, an expansion device and an evaporator in which the liquid refrigerant is flashed into vapor, and then returned to the compressor. Although under ideal operating conditions, only vapor phase refrigerant is passed to the intake of the compressor, it is common, under less than ideal conditions, for liquid containing refrigerant to pass into the compressor intake.

The potential for damage to such components of the compressor as bearing and valves, resulting from intake of liquid refrigerant, has been addressed in the past by one of either over-design of compressor components so that they are not damaged by expected liquid refrigerant intake, or by a restriction in the flow line up stream of the compressor intake, so that upon passing the restriction, any liquid phase refrigerant flashes into vapor to be drawn into the compressor intake. Both of these approaches have disadvantages. Over designing the compressor components entails increased compressor manufacturing costs, whereas use of restriction in the compressor intake lowers efficiency of the overall system.

In light of the foregoing, there is a need for a low cost, efficient solution to liquid phase refrigerant intake to the compressor of a mechanical refrigeration system.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the invention is directed to a liquid arresting valve for a refrigeration compressor having a refrigerant intake. The valve includes a housing having an inlet end to receive liquid and vapor phase refrigerant from an evaporator and an outlet end for connection to the refrigerant intake of the compressor. A valve body is movable in the housing between an open position permitting substantially unrestricted flow of vapor phase refrigerant between the inlet and outlet ends of the housing, and a flow restricting position to cause liquid containing refrigerant entering the inlet end of the housing to exit through the outlet end of the housing as vapor phase refrigerant.

In another aspect, the invention is directed to a method for arresting liquid from a refrigeration compressor intake, comprising the steps of enabling substantially unrestricted flow of vapor phase refrigerant to the compressor intake when the refrigerant flowing to the compressor intake is substantially free of liquid refrigerant, and restricting flow of refrigerant containing liquid to the compressor intake, and thereby flashing the liquid refrigerant into vapor prior to reaching the compressor intake when the refrigerant flowing to the compressor intake includes more than a predetermined acceptable amount of liquid refrigerant. The restriction step is initiated by response to increased density of refrigerant containing liquid.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

Reference will now be made in detail to exemplary embodiments of the invention, examples of which are illustrated in the accompanying drawings. Wherever possible, the same reference numbers Will be used throughout the drawings to refer to the same or like parts.

In accordance with the present invention, a liquid arresting valve is provided for the intake of a refrigeration compressor so that flow of refrigerant to the compressor intake is substantially unrestricted when the refrigerant is vapor. When there is liquid in the refrigerant at the compressor intake, however, the valve operates to restrict flow of the refrigerant and flash the liquid refrigerant into vapor before the refrigerant reaches the compressor intake. The valve actuates to restrict flow in response to the increased density of refrigerant flow when it contains liquid.

Figure 2:
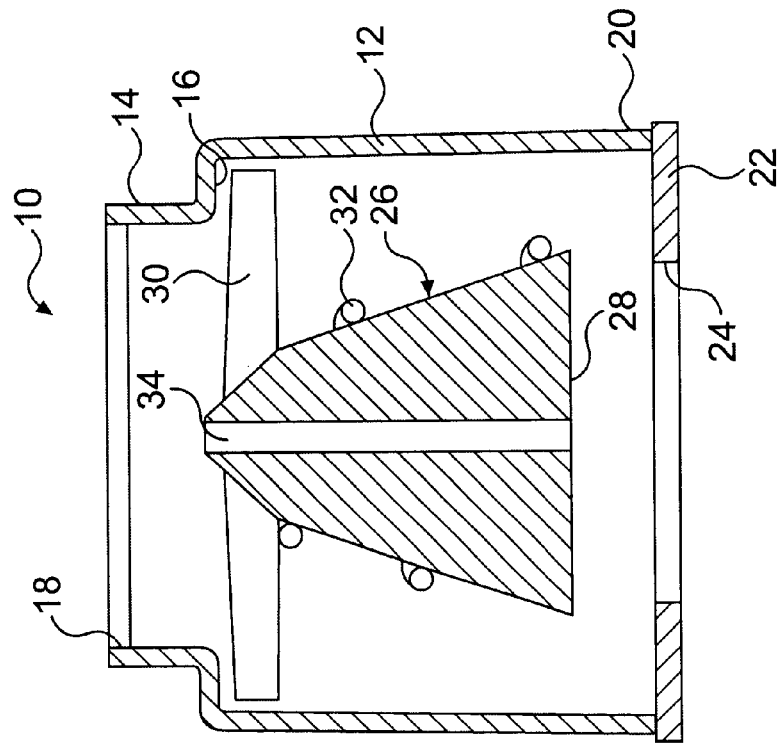
FIG. 2 is a longitudinal cross section of the valve shown in FIG. 1.
Figure 1:
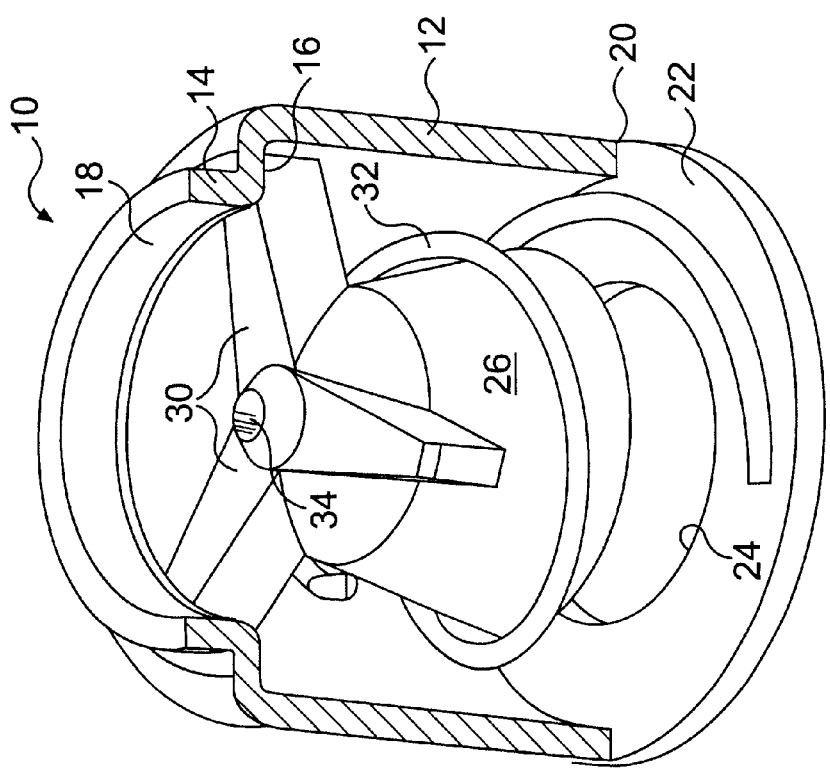
FIG. 1 is a cut-away perspective view illustrating a preferred embodiment of the liquid arresting valve of the present invention.

In the embodiment illustrated in FIGS. 1 and 2 of the drawings, a liquid arresting valve, generally designated by the reference numeral 10, is shown to include a housing 12 of generally cylindrical configuration and formed with an inlet end 14 of reduced diameter to define an annular shoulder 16 and a circular inlet port 18. An outlet end 20 of the housing 12 is partially closed by a plate 22 welded or otherwise secured and sealed to the housing 12. The plate 22 has a central opening 24 to define an outlet port of the valve housing 12.

Movable within the valve housing 12 is a valve body 26 of generally frusto-conical configuration and having a base or seating surface 28 at one end, which faces the plate 22 of the housing 12. At the opposite end of the valve body 22, a plurality of arms 30 (three in the illustrated embodiment) are connected to the valve body 26 and radiate therefrom to serve as guides for movement of the valve body along the length of the valve housing 12, and also to seat against the annular shoulder 16 of the housing 12. As shown, the ends of the arms 30 are slightly spaced from and/or slidably engage the inner wall surface of the housing 12.

A tapered helical spring 32 abuts the plate 22 at one end, and engages with the bottom of one or more of the arms 30 at the opposite end. The spring 32 normally biases the valve body to a position in which the arms 30 engage the annular shoulder 16 on the housing. As shown most clearly in FIG. 2, the valve body 26 has a central, axial, through-passage or nozzle 34 of relatively small diameter.

Figure 6:
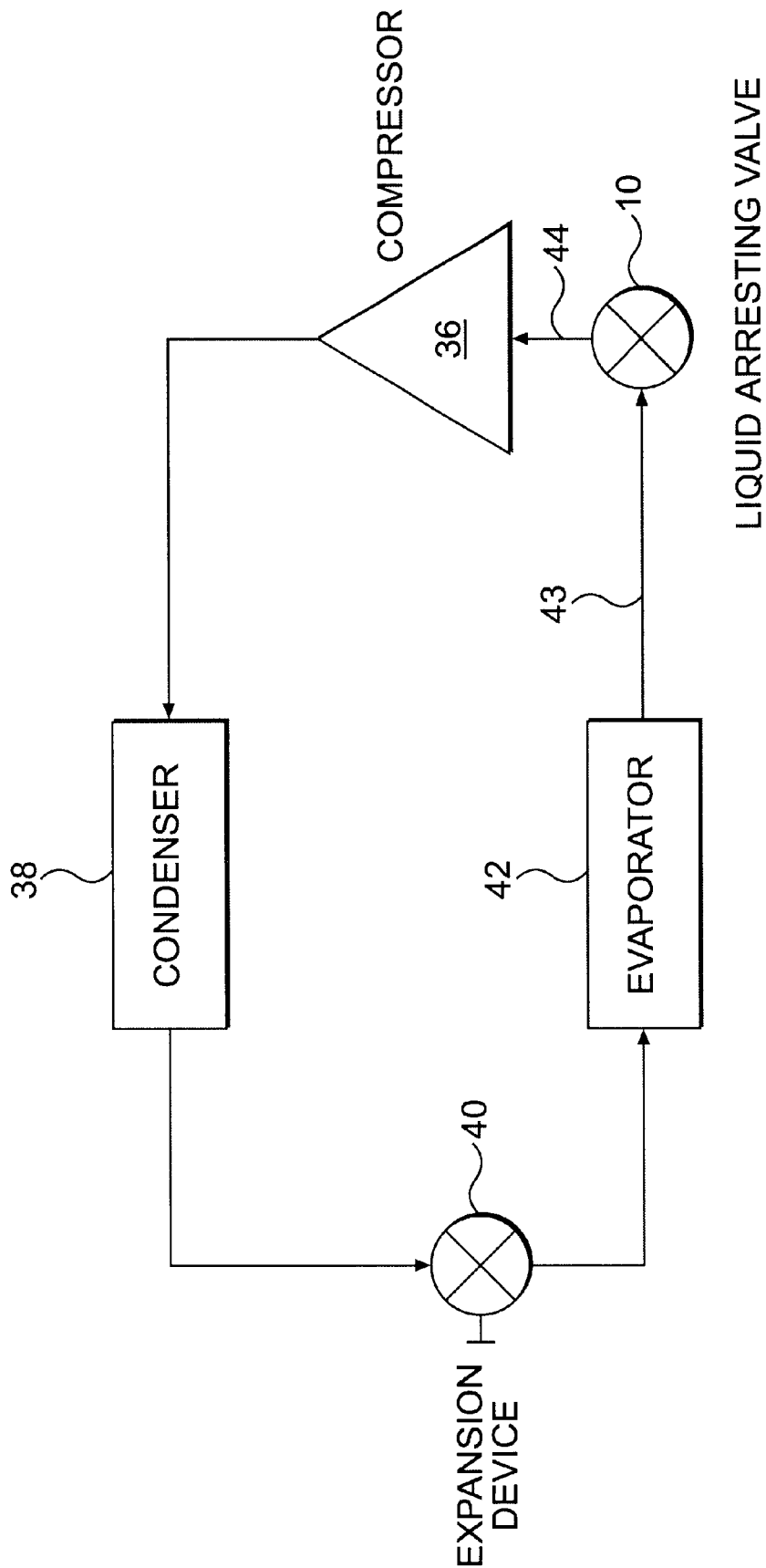
FIG. 6 is a schematic diagram illustrating the liquid actuated valve of the present invention in a refrigeration system.

The liquid arresting valve 10 is intended for use in a refrigeration system represented schematically in FIG. 6 of the drawings. As may be understood from FIG. 6, a compressor 36 circulates refrigerant through a condenser 38, in which a refrigerant is cooled and liquified, an expansion device 40 and an evaporator 42 in which the liquid refrigerant is flashed into vapor, and then returned to the compressor 36. In the represented system, the liquid arresting valve 10 is located in a flow line 43 between the outlet of the evaporator 42 and the intake 44 of the compressor 36. The valve 10, however, also can be incorporated into the intake of the compressor or connected directly to the intake 44.

In normal operation of the refrigeration system, the refrigerant returned to the intake of the compressor is completely vapor or gas phase refrigerant. However, under certain conditions of operation, the refrigerant at the compressor intake 44 may contain an adequate percentage of liquid phase refrigerant to cause damage to the compressor 36. Such operating conditions that can cause unacceptable amounts of liquid refrigerant at the compressor intake, may include for example, system designs or installations where refrigerant can condense in the suction line during an off cycle; improper operation of the expansion device to allow excess refrigerant into the evaporator, which cannot vaporize all the liquid; system overcharge, i.e., excess refrigerant filled into the system; lack of air flow across evaporator resulting in improper heat transfer making it impossible to vaporize all the liquid refrigerant; or a defrost cycle in a heat pump.

The liquid arresting valve of the present invention operates in response to the quality of refrigerant expressed, for example, as a ratio of gas to liquid or as the percentage of gas to the total mass of the refrigerant, to allow unimpeded flow of 100% gas and to restrict passage of refrigerant having a lower percentage of gas and an unacceptable percentage of liquid. In the valve 10 of the described embodiment, unimpeded flow occurs when the valve body 26 is retained with the arms 30 against the housing shoulder 16 by the spring 32. Refrigerant flow is restricted when the base 28 of the valve body 26 seats against the plate 24 by loading and deflecting the spring 32, such restriction of flow resulting from the relatively small cross-sectional area of the through-passage 34. Due to the restricted flow, liquid phase refrigerant is converted or flashed into vapor exiting the valve 10 to the compressor intake 44. When the quality of the refrigerant returns to 100% gas, or whatever lower percentage that is acceptable for the compressor and system design, the spring 32 returns the valve body to the open condition shown in FIGS. 1 and 2 of the drawings.

The manner in which the liquid arresting valve 10 responds to the gas/liquid quality of refrigerant at the compressor intake may be understood by reference to Table 1 in which operating parameter values of an exemplary refrigeration system are tabulated for refrigerant flow containing 100% gas or vapor phase refrigerant at the compressor intake and liquid containing refrigerant, respectively.

TABLE 1

| OPERATING PARAMETERS | GAS CONDITION MAX FLOW | LIQUID CONDITION |
|---|---|---|
| Quality (Mgas/Mtot) into Valve | 100% | 85% |
| Average Fluid Density into Compressor ($lb_{mass}/in^3$) | 0.0010 | 0.0076 |
| Measured Pressure Drop across Valve (psi) | 0.7 | 5.5 |
| Mass Flow Rate ($lb_{mass}/sec$) | 0.197 | 1.502 |
| Avg. Velocity Before Valve (in/sec) | 262.9 | 262.9 |
| Flow Rate Momentum Force on Valve ($lb_{force}$) | 0.13 | 1.02 |
| Force on Valve Due to Pressure Drop ($lb_{force}$) | 0.53 | 4.13 |
| Total Force on Valve Due to Liquid Flow ($lb_{force}$) | 0.7 | 5.1 |
| Deflection of Spring Not including Pre-Compression (in) | 0.00 | 0.97 |

In Table 1, the parameter values are based on a system having the following input variables: cross-sectional area of valve body=0.75 $in^2$; spring rate of valve=3.5 $lb_{force}/in$; liquid density=0.0451 $lb_{mass}/in^3$; gas density=0.0010 $lb_{mass}/in^3$; pre-compressed distance of spring=0.5 in; volume of compression chamber=3.4 $in^3$; and compression speed=58 compressions/sec.

From Table 1, it will be appreciated that the difference in Mass Flow Rate between the respective GAS and LIQUID conditions, i.e., 0.197 $lb_{mass}/sec$ for 100% gas vs. 1.502 $lb_{mass}/sec$ for 85% gas (15% liquid), results in a total force on the valve body that is either inadequate to deflect the valve body spring in the GAS condition, or in a total force on the valve body in the LIQUID condition that deflects the valve body spring. In the example represented by Table 1, a total force of 0.7 pounds on the valve body in the GAS condition results in no deflection of the valve body spring, whereas a total force of 5.1 pounds on the valve body in the LIQUID condition moves the valve body against the spring into the seated, flow restricting position.

The specific size, shape and design of a liquid arresting valve of the present invention can be determined through empirical testing, preferably combined with analytical modeling, to arrive at proposed designs. Through such testing and calculation, an acceptable design for a given application can be completed and applied.

Figure 3:
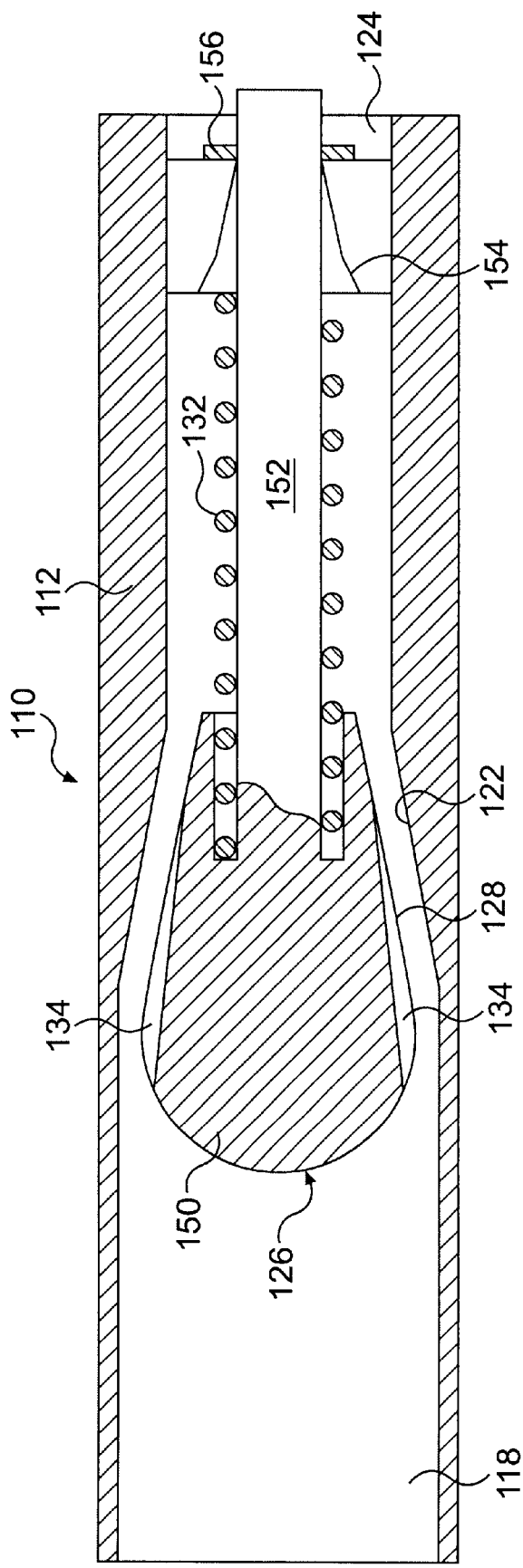
FIG. 3 is a longitudinal cross section of an alternative embodiment of the invention.

In FIG. 3, an alternative embodiment of the invention is shown and in which, parts corresponding to parts of the embodiment of FIGS. 1 and 2 are designated the same reference numbers but to which the number 100 has been added. Thus, the liquid arresting valve 110 in the embodiment of FIG. 3 has a generally cylindrical housing 112 having an inlet opening 118 at one end, an outlet opening 124 at the opposite end, and an intermediate tapered seat portion. The valve body 126 includes a dome-shaped head portion 150 fixed to one end of a shaft portion 152, in turn, slidable in a spider bearing 154 near the outlet opening 124. A spring 132 extends between the spider bearing 154 and the head portion 150 to bias the valve body 126 toward the inlet opening 118. A stop washer 156 at the end of the shaft portion 152 opposite the head portion 150 limits movement of the valve body 126 by the spring 132 toward the inlet opening 118.

The dome-shaped head 150 of the valve body 126 has a tapered seating surface 128 that complements the tapered seating portion 122 of the housing 112. Further, one or more axial slots 134 are formed in the tapered seating surface 128 to enable restricted flow of refrigerant when the surface 128 is seated against the seating portion 122.

Operation of the liquid arresting valve 110 of FIG. 3 is similar to that of the liquid arresting valve 10 of FIGS. 1 and 2 and under the conditions represented by Table 1. That is, the valve body 126 is normally in the open position shown in FIG. 3 to provide unrestricted flow of gas phase refrigerant. Increased mass flow rate of liquid containing refrigerant develops a force resulting in deflection of the spring 132 and movement of the valve body 126 into seating engagement with the tapered seat portion 122 and restricted refrigerant flow through the axial slots 134.

Figure 4:
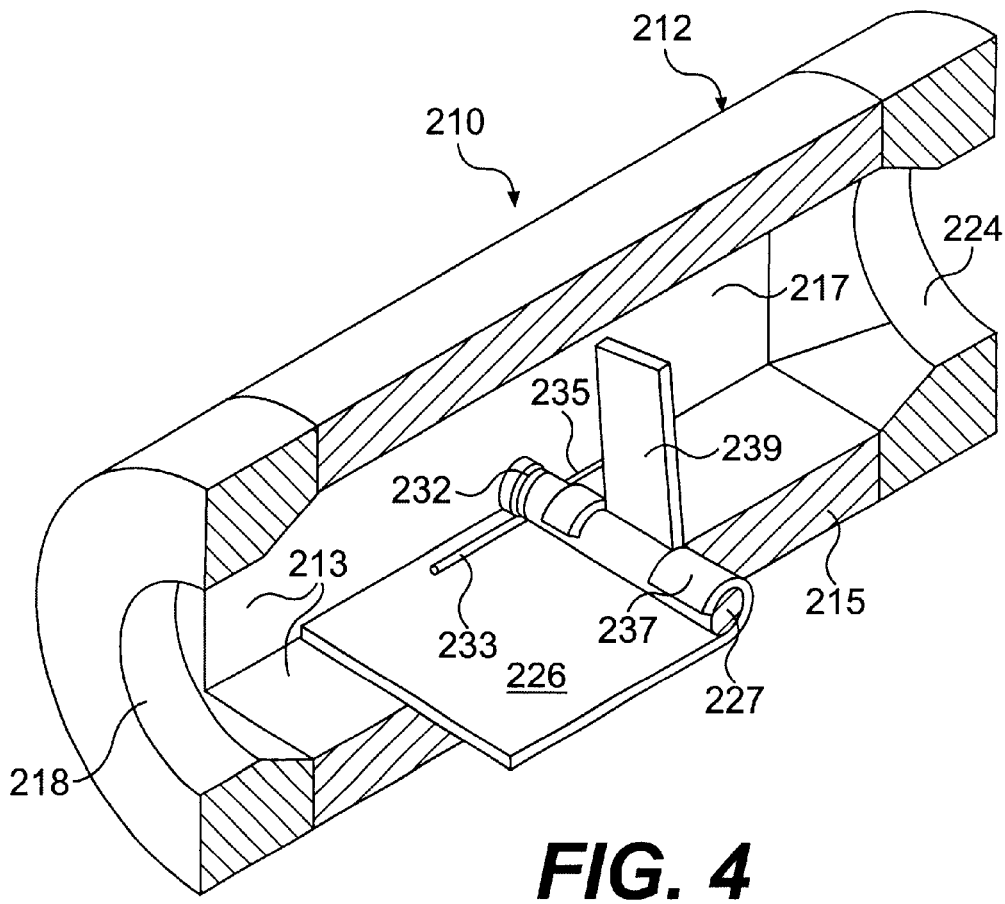
FIG. 4 is a cut-away perspective view illustrating still another embodiment of the present invention.
Figure 5:
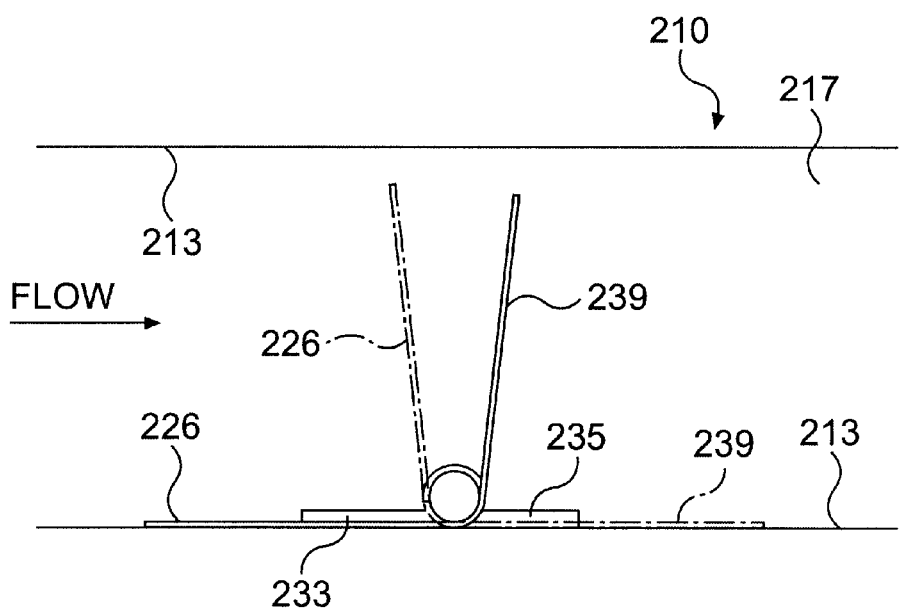
FIG. 5 is a largely schematic view depicting operation of the embodiment of FIG. 4.

Another alternative embodiment of the liquid arresting valve of the present invention is shown in FIGS. 4 and 5 of the drawings and generally designated by the reference number 210. The liquid arresting valve 210 includes a housing 212 having an inlet opening 218 and an outlet opening 224. Although the exterior of the housing 212 is shown to be of generally cylindrical shape, interior housing surfaces 213 of a central housing component 215 define a valve passage 217 that is preferably of square or rectangular cross-sectional configuration.

A valve body plate 226, generally rectangular in shape, is pivotally supported on a pin 227 and biased against an interior surface 213 by a spring 232 coiled on the pin and having oppositely extending arms 233 and 235 bearing respectively against the top or back surface of the valve body plate 226 and the surface 213 against which the body plate 226 is biased. The valve body plate 226 is stamped or otherwise formed from a single sheet of plate material to include a pivot bearing portion 237 to engage the pin 227, and a flap-like vane 239 projecting from the pivot bearing portion 237 at an angle of about 90°, preferably 98°, to the body plate 226.

Operation of the liquid arresting valve 210 is depicted in FIG. 5. The valve body plate 226 is normally biased by the spring 232 to lie flat against an interior surface 213 of the valve passage 217. As a result, the vane 239 normally projects into the passage 217 but is of a size to permit unrestricted flow of gas phase refrigerant through the valve 210. However, upon the occurrence of increased mass flow rate of liquid containing refrigerant, the force imposed on the vane 239 by that increased mass flow rate is adequate to at least initiate upward pivotal movement of the valve body plate 226 into the passageway 217 so that further movement of the valve body plate 226 to the upright position, illustrated in phantom lines in FIG. 5, will occur by force of the mass flow rate against the bottom or front side of the valve body plate 226. The size of the valve body plate 226 relative to the cross-sectional size of the valve passageway 217 is such that restricted flow of liquid containing refrigerant is caused by flow between the top and side edges of the upstanding valve body plate 226 and the internal surfaces 213 of the passageway 217. When the restricted flow flashes off the liquid in the refrigerant flow, the spring 232 will cause the plate 226 to return to its original, lowered position.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A liquid arresting valve for a refrigeration compressor having a refrigerant intake, comprising:
   a housing having an inlet end to receive refrigerant from an evaporator and an outlet end for connection to the refrigerant intake of the compressor;
   a valve body movable in the housing between an open position permitting substantially unrestricted flow of vapor phase refrigerant between the inlet and outlet ends of the housing when the refrigerant flow contains no more than a preselected acceptable level of liquid refrigerant, and a flow restricting position to cause liquid containing refrigerant entering the inlet end of the housing to flash and exit through the outlet end of the housing as vapor phase refrigerant when more than the preselected level of liquid refrigerant is in the refrigerant flow; and
   a spring that retains the valve body in the open position under force of vapor phase refrigerant flow and yields to the flow restricting position under force of liquid containing refrigerant.

2. The liquid arresting valve of claim 1, wherein the valve body is reciprocal in the housing between the open and flow restricting positions.

3. The liquid arresting valve of claim 2, wherein the valve body includes an internal flow restricting passage.

4. The liquid arresting valve of claim 3, wherein the valve body is of frusto-conical configuration and has a seating surface at one end to engage a plate at the outlet end of the housing.

5. The liquid arresting valve of claim 4, wherein the valve body has one or more guide surfaces for guiding movement of the valve body within the housing.

6. The liquid arresting valve of claim 5, wherein the one or more guide surfaces includes radial arms opposite the one end.

7. The liquid arresting valve of claim 2, wherein the valve body includes one or more peripheral flow restricting passages.

8. The liquid arresting valve of claim 7, wherein the valve body has a dome-shaped head portion having a tapered external seating portion engageable with a tapered internal seat in the housing.

9. The liquid arresting valve of claim 8, wherein the peripheral flow restricting passages are in the tapered external seating portion.

10. The liquid arresting valve of claim 1, wherein the valve body is pivotal in the housing between the open and flow restricting positions.

11. The liquid arresting valve of claim 10, wherein the valve body comprises a plate disposed parallel to refrigerant flow through the housing in the open position and substantially perpendicular to refrigerant flow through the housing in the flow restricting position.

12. The liquid arresting valve of claim 11, including a vane projecting from the plate to initiate movement of the plate by liquid containing refrigerant flow from the open position.

13. The liquid arresting valve of claim 12, wherein the vane projects from the plate at an angle of 98°.

14. The liquid arresting valve of claim 10, wherein the housing has internal surfaces defining a rectangular cross-section and the plate is rectangular and dimensioned to allow refrigerant flow between edges thereof and the internal surfaces of the housing in the flow restricting position.

15. A method for arresting liquid from a refrigeration compressor intake, comprising the steps of:

biasing a valve body into an open position to enable substantially unrestricted flow of vapor phase refrigerant to the compressor intake when the refrigerant flowing to the intake is substantially free of liquid refrigerant; and moving the valve body to a flow restricting position to allow a restricted flow of refrigerant containing liquid to the compressor intake, thereby flashing the liquid refrigerant into vapor prior to reaching the compressor intake, when the refrigerant flowing to the intake includes more than a predetermined acceptable amount of liquid refrigerant.

16. The method of claim 15, wherein the restriction step is initiated in response to increased density of refrigerant containing liquid.

17. In a refrigeration system including an evaporator and a compressor having an intake for receiving refrigerant from the evaporator, the improvement comprising:

a liquid arresting valve for causing liquid containing refrigerant to enter the intake as vapor phase refrigerant, the liquid arresting valve including a valve body movable between an open position permitting substantially unrestricted flow of vapor phase refrigerant and a flow restricting position to convert the liquid containing refrigerant to vapor phase refrigerant and a spring that retains the valve body in the open position under force of vapor phase refrigerant flow and yields to the flow restricting position under force of liquid containing refrigerant.

* * * * *